United States Patent
Wendt et al.

(10) Patent No.: US 10,247,232 B2
(45) Date of Patent: Apr. 2, 2019

(54) ROLLING-ELEMENT BEARING CAGE OR ROLLING-ELEMENT BEARING CAGE SEGMENT

(71) Applicant: Aktiebolaget SKF, Gothenburg (SE)

(72) Inventors: Volker Wendt, Uechtelhausen/Zell (DE); Padelis Katsaros, Schweinfurt (DE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/637,612

(22) Filed: Jun. 29, 2017

(65) Prior Publication Data
US 2018/0003222 A1 Jan. 4, 2018

(30) Foreign Application Priority Data

Jun. 30, 2016 (DE) .......... 10 2016 211 917

(51) Int. Cl.
| | |
|---|---|
| *F16C 33/46* | (2006.01) |
| *F16C 19/18* | (2006.01) |
| *F16C 33/54* | (2006.01) |
| *F16C 33/48* | (2006.01) |
| *F16C 33/56* | (2006.01) |

(52) U.S. Cl.
CPC .......... *F16C 19/181* (2013.01); *F16C 19/188* (2013.01); *F16C 33/4676* (2013.01); *F16C 33/541* (2013.01); *F16C 33/545* (2013.01); *F16C 33/48* (2013.01); *F16C 33/546* (2013.01); *F16C 33/56* (2013.01)

(58) Field of Classification Search
CPC ..... F16C 33/46–33/467; F16C 33/4676; F16C 19/181; F16C 19/188; F16C 33/541; F16C 33/545; F16C 33/48; F16C 33/546; F16C 33/56

See application file for complete search history.

(56) References Cited

U.S. PATENT DOCUMENTS 1,397,226 A * 11/1921 Michaud ................. F16C 19/26
　　　　　　　　　　　　　　　　　　　　　　　　　318/158
1,598,025 A *  8/1926 Stevens ................. F16C 33/543
　　　　　　　　　　　　　　　　　　　　　　　　　29/898.067

(Continued)

FOREIGN PATENT DOCUMENTS

FR　　　3018570 A　*　9/2015
JP　　2003287033 A　* 10/2003　............ F16C 19/364

(Continued)

OTHER PUBLICATIONS

Machine Translation of JP-2013224731-A (Year: 2013).*
Machine Translation of JP-2012082916-A (Year: 2012).*

*Primary Examiner* — Alan B Waits
(74) *Attorney, Agent, or Firm* — Bryan Peckjian; SKF USA Inc. Patent Dept.

(57) ABSTRACT

A rolling-element bearing cage or segment configured to guide at least one rolling element includes a first circumferential ring connected to a second circumferential ring by a plurality of axially extending bridges. A first one of the bridges includes a first axial portion that has a cross-section perpendicular to the axial direction and a cross sectional area and a peripheral length. The peripheral length of the cross section of the first axial portion is greater than a peripheral length of a smallest rectangle bounding the cross section.

17 Claims, 4 Drawing Sheets

(56) References Cited

U.S. PATENT DOCUMENTS

| | | | | | |
|---|---|---|---|---|---|
| 1,765,648 | A | * | 6/1930 | Bott | F16C 33/4629 29/898.065 |
| 2,591,160 | A | * | 4/1952 | Kilian | B21D 53/12 384/575 |
| 3,144,703 | A | * | 8/1964 | Giacomo | B21D 53/12 29/558 |
| 3,438,685 | A | * | 4/1969 | Teufel | F16C 33/543 384/575 |
| 4,547,084 | A | * | 10/1985 | Meining | F16C 33/4635 384/576 |
| 5,584,583 | A | * | 12/1996 | Hidano | F16C 19/463 384/470 |
| 2003/0068110 | A1 | * | 4/2003 | Matsui | F16C 33/4623 384/572 |
| 2008/0205813 | A1 | * | 8/2008 | Sada | F16C 33/46 384/571 |
| 2009/0003751 | A1 | * | 1/2009 | Auffahrt | F16C 33/6681 384/575 |
| 2009/0208161 | A1 | * | 8/2009 | Jauernig | F16C 19/34 384/572 |
| 2009/0215583 | A1 | * | 8/2009 | Urakami | F16C 3/02 475/348 |
| 2012/0321237 | A1 | * | 12/2012 | Usuki | F16C 33/4635 384/572 |
| 2013/0202241 | A1 | * | 8/2013 | Nakashima | F16C 33/46 384/572 |
| 2014/0169720 | A1 | * | 6/2014 | Durney | F16C 33/6629 384/578 |
| 2015/0211577 | A1 | * | 7/2015 | Adane | F16C 33/6614 384/527 |

FOREIGN PATENT DOCUMENTS

| | | | | | |
|---|---|---|---|---|---|
| JP | 2006132724 | A | * | 5/2006 | F16C 33/6614 |
| JP | 2012082916 | A | * | 4/2012 | F16C 33/6681 |
| JP | 2013224731 | A | * | 10/2013 | F16C 33/4652 |

* cited by examiner

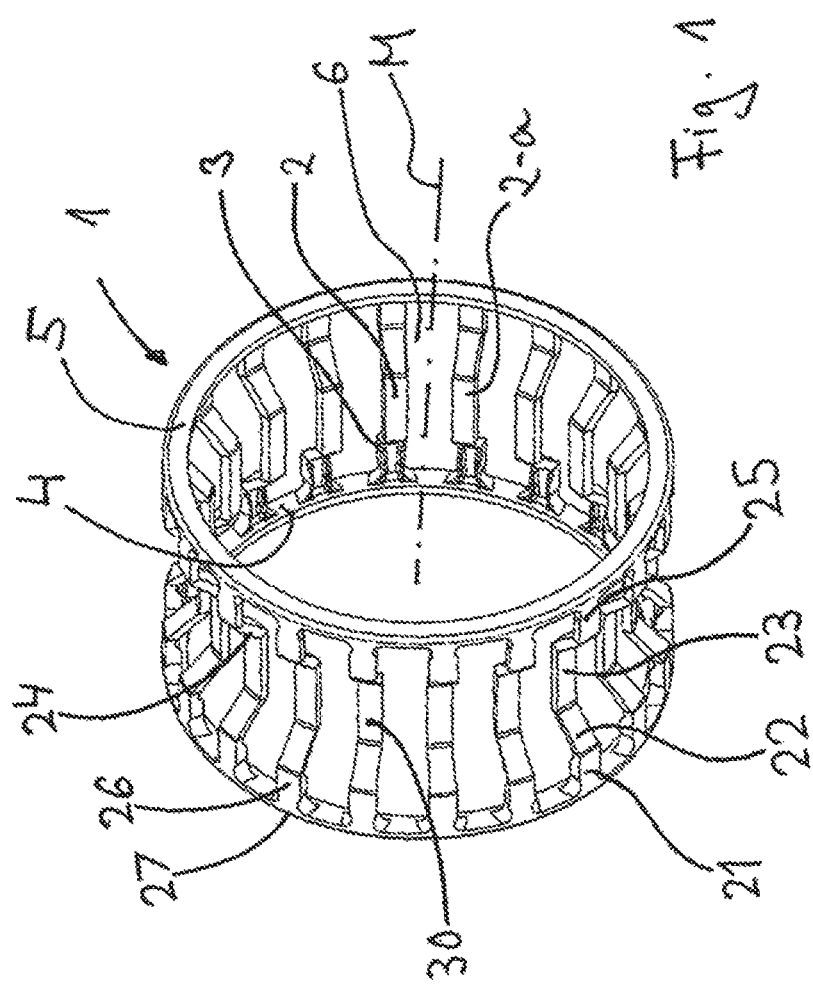

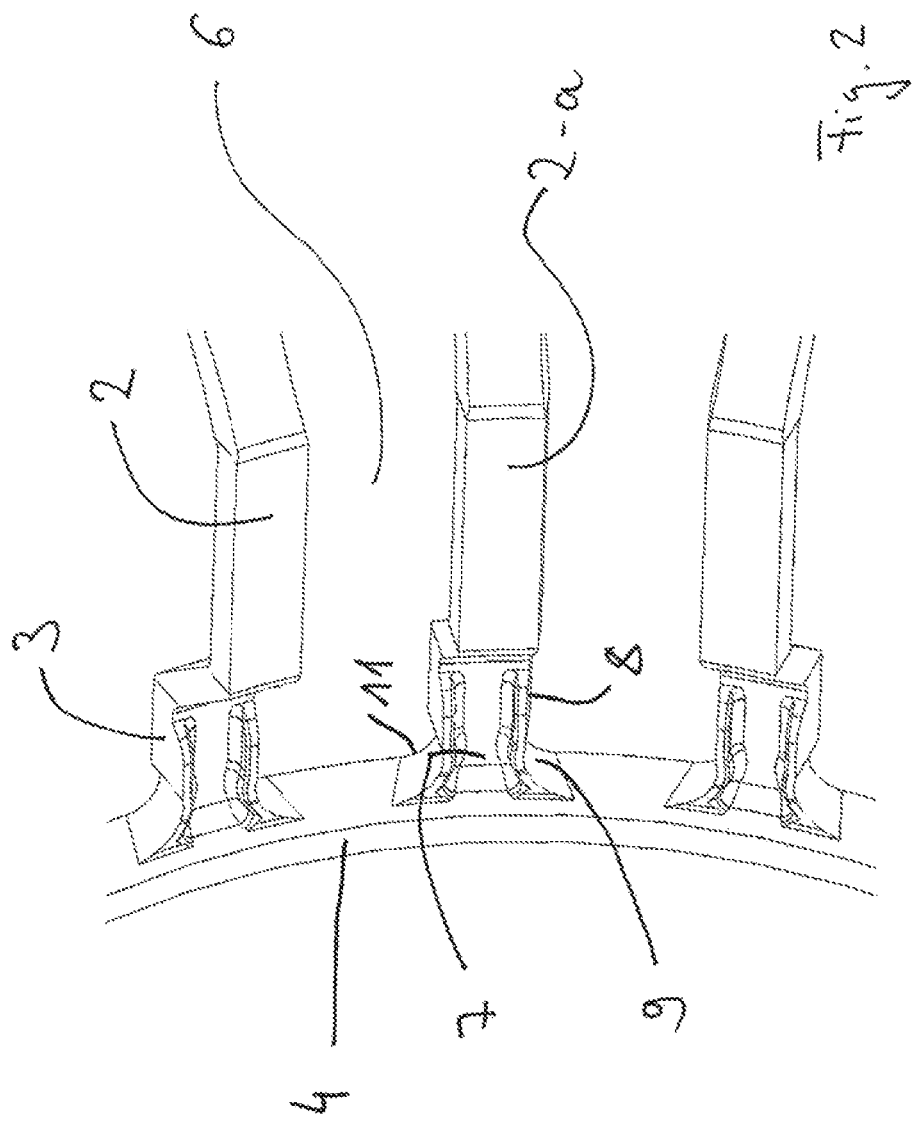

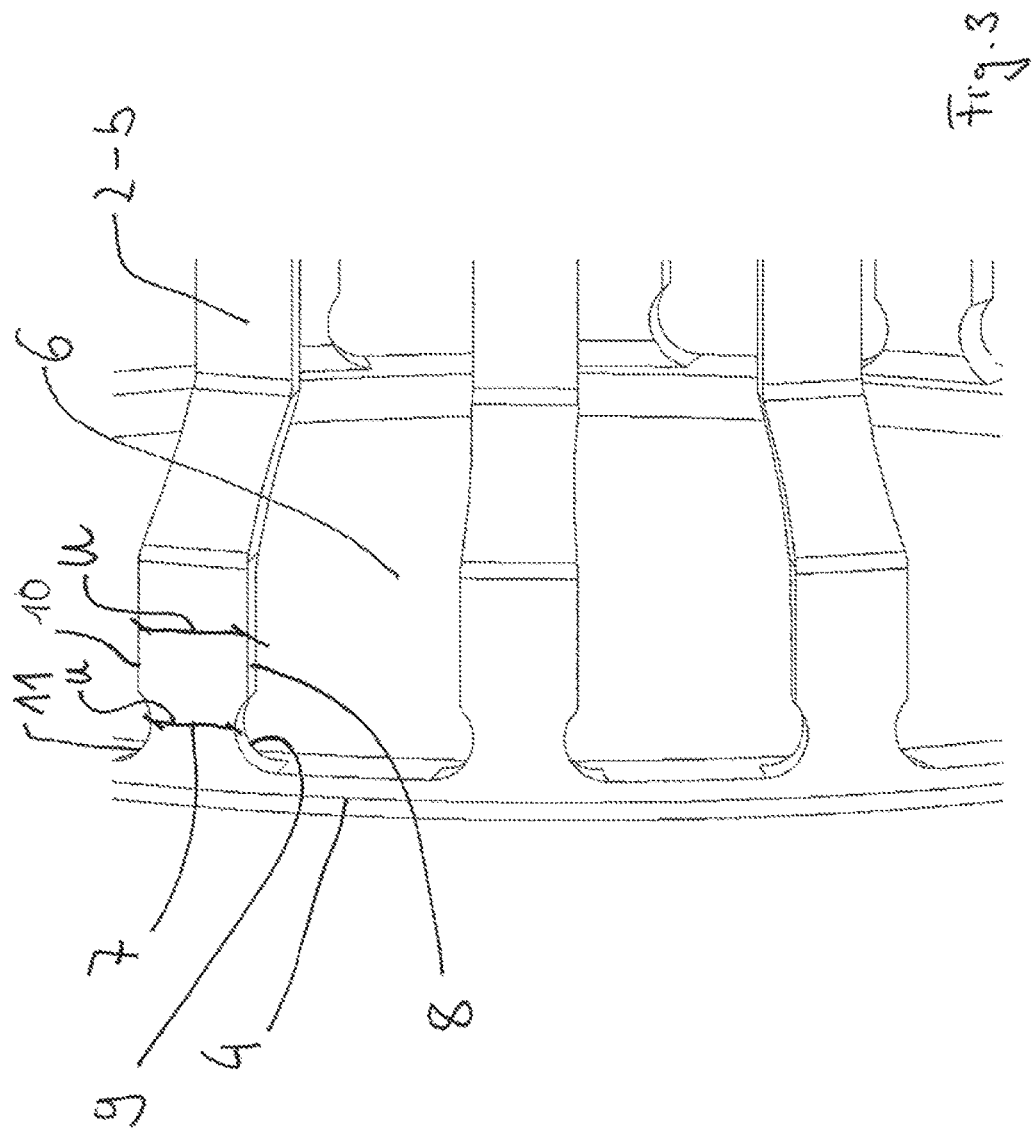

ROLLING-ELEMENT BEARING CAGE OR ROLLING-ELEMENT BEARING CAGE SEGMENT

CROSS-REFERENCE

This application claims priority to German patent application no. 10 2016 211 917.6 filed on Jun. 30, 2016, the contents of which are fully incorporated herein by reference.

TECHNOLOGICAL FIELD

Exemplary embodiments relate to a rolling-element bearing-cage or a -segment, which is configured to guide at least one rolling element.

BACKGROUND

In order to guide rolling elements in a rolling-element bearing a variety of different cages are used. A plurality of cage segments can also be used that complement each other to form a cage. For this purpose the cages usually include a plurality of pockets, wherein in each pocket a rolling element can be guided. The pocket can be delimited, for example, in the circumferential direction, by a bridge. The bridges usually connect two circumferential rings, which each delimit the pockets in an axial direction.

When cages support rolling elements that have edges, for example, needle rollers, cylindrical rollers, tapered rollers, or the like, the edges of these rolling elements can run or rub against the rolling-element bearing cage. The cage or the rolling element can thereby be damaged. The rubbing should therefore be avoided to the extent possible.

In order to reduce or prevent the rubbing, many conventional cages have recess in a bridge region that effectively prevent such edge contacts. The recesses are usually located in a transition to the circumferential rings.

Under unfavorable circumstances, such recesses can lead to a cage failure. This can be due to the fact that due to the recess a width or an extension of the bridge is reduced in a circumferential direction. A material weakening can thereby possibly arise, which is especially undesirable in the transition to the annular side region of the cage. Under unfavorable circumstances, in the event of a recurring load that acts, for example, on the cage in the event of a rolling-element tilting or a rolling-element skewing, damage to the rolling-element bearing cage can occur. A rolling-element skewing can, for example, load the bridge in a region near the recesses and generate a material stress in the recesses. Under unfavorable circumstances this can lead to a breakage of the cage and to a bearing failure. This is undesirable.

Some conventional rolling-element bearing cages are treated by shot peening in order to reduce a tendency for bridge breakages. Compressive stresses should thereby be reduced at a bridge surface, specifically in the region of the recesses. This treatment can be very expensive and under unfavorable circumstances, unfortunately, also not be sufficiently effective.

SUMMARY

There is therefore the need to provide an improved rolling-element bearing cage or a segment for a rolling-element bearing cage, wherein a risk of the bridge or cage breakage is reduced. This need is met by rolling-element bearing cage or a rolling-element bearing cage segment according to the disclosure. In the following, all features that are disclosed for a rolling-element bearing cage can also be implemented in a rolling-element bearing cage segment or a plurality of rolling-element bearing cage segments that complement each other to form a rolling-element bearing cage.

Exemplary embodiments relate to a rolling-element bearing cage that is configured to guide at least one rolling element. For this purpose the rolling-element bearing cage comprises at least one bridge. At least in one section the bridge has a cross-sectional area disposed perpendicular to the axial direction, which cross-sectional area has a greater edge length than a rectangle having the same area.

In some exemplary embodiments, since the bridge at least sectionally has a cross-sectional shape or a profile due to which a comparably large edge length results, an increase of the bending stiffness in the section of the bridge arises. Since the stiffness is increased the risk of a cage breakage can at least be reduced.

The edge length can be, for example, a circumference of the cross-sectional area. In the case of cross-sectional areas that have cavities or recesses, for example, circular ring disks or the like, edges disposed inside the cross-sectional surface can also belong to the edge length or the circumference. In addition, the edge length can also be greater than with a rectangle having the same width and the same height as the cross-sectional area. In some exemplary embodiments a bending stiffness can thereby be further increased. The section can thus have a higher moment of resistance than regions of the bridge outside the section or profiles having the same cross-sectional area but a different shape. For example, the section can have a moment of resistance that is greater than $$W_y = A\frac{h}{6};$$

wherein A is an area of a rectangle and h is a height of the rectangle. Additionally or alternatively the cross-sectional area can also be configured such that a greater moment of resistance arises than with a circle of the same area. In other words, the moment of resistance can be greater than $$W_y = \frac{Ar}{4};$$

wherein A is the area of the circle and r a radius of the circle.

The larger edge length can be achieved, for example, by the cage bridge having an angled material surface or a profile shape in the section. In other words the section can also be referred to as a profile reinforcement. The bridge can thereby have a larger surface area in the section than in regions of identical axial length outside the section having the described edge length. For example, a surface of a component, for example, of a bridge, can be any surface of the component. For example, with hollow profiles inner surfaces can also be surface areas.

Additionally or alternatively, for example, a bending stiffness in the section due to the shape of the cross-sectional area can be higher by at least 2%, 5%, 10%, 20%, 25%, 30%, 35%, 40%, or 50% than in a rectangle that has the same surface area, or even in other bridge regions outside the section, which bridge regions have a different cross-section. In some exemplary embodiments a sufficient increase of the bending stiffness can thereby be achieved.

The rolling-element bearing cage can have all possible shapes here, for example, it can include bridges that are disposed essentially parallel to the axial direction. Under certain circumstances the bridge itself can be disposed at different radii. Outside the section the bridge, for example, can have a rectangular cross-section or an essentially rectangular cross-section.

Additionally or alternatively the section can be disposed directly adjacent in the axial direction to a ring or ring segment disposed in the circumferential direction, on which ring or ring segment the bridge is attached. In some exemplary embodiments it can thus be made possible that the bending stiffness is increased in a region that tends to fail under unfavorable circumstances.

Additionally or alternatively, at least in the axial direction the section can be disposed overlapping with respect to a tapering of the bridge in the circumferential direction. Although the bridge has the tapering, in some exemplary embodiments the cage can have a sufficient bending stiffness and thus a safeguard against failure. The tapering can, for example, arise from the fact that the bridge includes at least one recess. The recess can be disposed, for example, in order to prevent a rubbing of a rolling element in a corner region between the bridge and the ring. The recess can be, for example, half-, quarter-circle-, or circular-sector-shaped. In some exemplary embodiments a rubbing can effectively be prevented by radius-shaped recesses. Under certain circumstances sharp corners generating a material removal and/or a heat effect, which can lead to a damaging of the cage, are at least reduced.

The recess can be disposed, for example, in a transition between the ring and the bridge. In some exemplary embodiments it can thereby be made possible that the recesses are disposed in a corner region of the pocket that is delimited by the bridge. In other exemplary embodiments the recess can be disposed only on the bridge, but directly adjacent to the ring in the axial direction.

The bridge can, for example, respectively have a recess on edges opposing in the circumferential direction. The recesses can be symmetric or have different sizes. In some exemplary embodiments the bridge can have the tapering only on one axial end or, however, also on both axial ends.

In some exemplary embodiments, in the section the bridge can have a cross-sectional shape that additionally includes regions oriented in the radial direction with respect to a conventional bridge shape or other regions of the bridge. In the section the bridge can have, for example, a larger cross-sectional area than outside the section. Here these regions have a smaller extension in the circumferential direction and/or in their entirety than the original bridge and the region including the tapering. The regions can be, for example, flanges that have a main extension in the axial direction. This can, for example, lead to the section additionally or alternatively being shaped as an I-profile, L-profile, T-profile, Z-profile, U-profile, H-profile, hollow profile, or the like. In some exemplary embodiments the bending stiffness can thereby be increased in a simple manner. The mentioned profiles can possibly be situated in a metal-plate cage. In some exemplary embodiments the section of the U-profile that connects the two flanges can have an extension in the radial direction that corresponds to the radial extension of the bridge outside the section or the radial extension of a conventional bridge. The flanges of the U-profile that project in the radial direction can, for example, be spaced from one another, be disposed on outer edges of the bridge and reinforce them. In some exemplary embodiments the cross-sectional area inside the section can be larger than outside the section.

Additionally or alternatively, in some exemplary embodiments the section can have an extension in the axial direction that corresponds to at least 5%, 10%, 20%, 25%, or 30% of a maximum extension of the bridge in the axial direction. In some exemplary embodiments it can thereby be made possible that at a sufficient length the bridge has an increased bending stiffness.

Additionally or alternatively the section can have an extension in the axial direction that corresponds at most to 25%, 30%, 40%, 50%, or 60% of a maximum extension of the bridge in the axial direction. In some exemplary embodiments it can thereby be made possible that in other regions outside the section the bridge can have its conventional bending stiffness. In this way, for example, the occurrence of predetermined breaking points can be minimized.

Additionally or alternatively the section can have an axial extension that corresponds at least or exactly to the axial extension of the tapering. In some exemplary embodiments it can thereby be made possible that a portion of bending stiffness that is lost due to the tapering is compensated for, but the bridge is otherwise not significantly more rigid. The section can be disposed, for example, such that it reinforces a bridge region that comprises the tapering. In other words, the tapering can be disposed inside the section in the axial direction.

Additionally or alternatively the rolling-element bearing cage can include a second circumferential ring. The two rings are connected to each other via a plurality of bridges. At a transition to these rings, viewed in the circumferential direction, each of the bridges includes a tapering. The tapering is configured to prevent a rubbing of the rolling element on the bridge and/or the ring. In the axial direction each of the bridges has a profile at least overlapping with the tapering that increases the bending stiffness of the bridge in this region. The profile can be, for example, a U-profile, an I-profile, a T-profile, a C-profile, a Z-profile, an H-profile, a hollow profile and/or the like.

In some exemplary embodiments, a rolling-element bearing cage or segment configured to guide at least one rolling element includes a first circumferential ring connected to a second circumferential ring by a plurality of axially extending bridges. A first bridge of the plurality of bridges includes a first axial portion, and the first axial portion has a cross-section perpendicular to the axial direction that has a cross sectional area and the cross section has a peripheral length that is greater than a peripheral length of a smallest rectangle bounding the cross section. In other words, the cross section when viewed in the axial direction is a two-dimensional figure that has an outer periphery having a length. The smallest possible rectangle that can be formed around the cross section also has a peripheral length, and the peripheral length of the cross section is greater than the peripheral length of that smallest rectangle that can be drawn around the cross section.

In some exemplary embodiments the rolling-element bearing cage comprises as material a metal plate, for example, steel, aluminum, brass, and/or the like. For example, the rolling-element bearing cage can be manufactured by stamping and bending. The rolling-element bearing cage can, for example, be suited for use in all possible rolling-element bearings.

The exemplary embodiments and their individual features disclosed in the above description, the following claims, and the accompanying Figures can be meaningful and implemented both individually and in any combination for the realization of an exemplary embodiment in its various designs.

BRIEF DESCRIPTION OF THE DRAWINGS

The Figures thus schematically show the following views.

FIG. 1 is a schematic perspective view of a rolling-element bearing cage according to an exemplary embodiment.

FIG. 2 is an enlarged schematic view of the rolling-element bearing cage of FIG. 1.

FIG. 3 is a further enlarged schematic view of the rolling-element bearing cage of FIG. 1, on which there is no reinforcing profile.

DETAILED DESCRIPTION

Figure 1A:
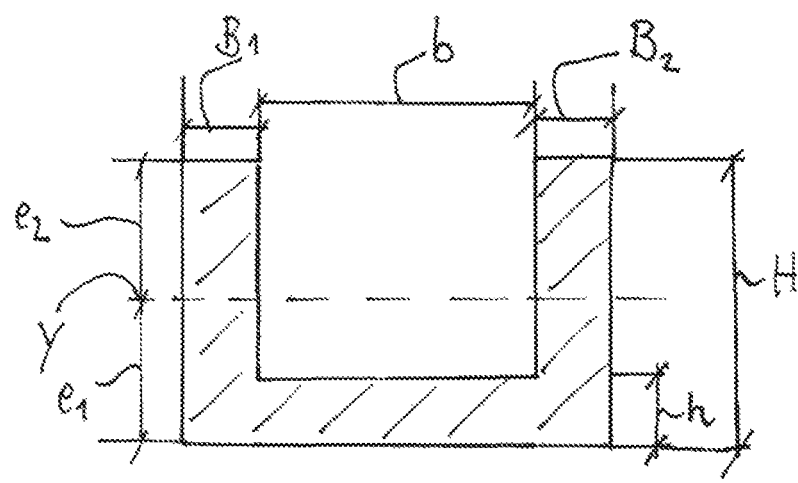
FIG. 1a is a schematic cross-section of a U-profile.

In the following description of the accompanying depictions, identical reference numbers designate identical or comparable components. Furthermore, summarizing reference numbers are used for components and objects that appear multiple times in an exemplary embodiment or in an illustration, but that are described together in terms of one or more common features. Components or objects that are described with the same or summarizing reference numbers can be embodied identically, but also optionally differently, in terms of individual, multiple, or all features, their dimensions, for example, as long as the description does not explicitly or implicitly indicate otherwise.

FIG. 1 shows a schematic depiction of a perspective view of a rolling-element bearing cage 1 according to an exemplary embodiment. FIGS. 2 and 3 show enlarged sections of FIG. 1.

The rolling-element bearing cage 1 is configured to guide at least one not-depicted rolling element. For this purpose the rolling-element bearing cage 1 includes at least one bridge 2. The bridge 2 includes at least one section 3 (also referred to as a first axial portion 21 in the claims) that has a cross-sectional surface disposed perpendicular to the axial direction M. The cross-sectional surface has a longer edge length than a rectangle having the same surface area. By way of further example, the bridge 2 comprises the first axial portion 21, a second axial portion 22, a third axial portion 23, a fourth axial portion 24, and a fifth axial portion 25. The first axial portion 21 connects to the first circumferential ring 4 and the fifth axial portion 25 connects to the second circumferential ring 5. The third axial portion 23 is connected to the first axial portion 21 by the second axial portion 22 and the third axial portion 23 being connected to the fifth axial portion 25 by the fourth axial portion 24. The first axial portion 21, having a radially outer surface 26, is flush with a radial outer surface 27 of the first circumferential ring 4. The fifth axial portion 25, having a radially outer surface 28, is flush with an outer surface 29 of the second circumferential ring 5. The third axial portion 23 has a radially outer surface 30 located radially inside of the first axial portion 21 and the fifth axial portion 25.

The edge length can be, for example, the length of a circumferential contour of the cross-section. In the section 3 the bridge 2 has a greater surface area than outside the section 3, wherein it is always based on pieces having identical axial extension. Due to the shaping of the bridge 2 in the section 3 a bending stiffness of the bridge 2 is increased in the section 3.

In the exemplary embodiment of FIG. 1 the bridge 2 has a U-profile in the section 3. A cross-section of a U-profile is depicted in FIG. 1a. Thus the section has a moment of resistance $W_y$ for which:

$$W_y = \frac{I_y}{e_{1,2}};$$

where for $I_y$: $I_y = \frac{BH^3 + bh^3}{3} - (BH + bh)e_1^2;$ with $B = B_1 + B_2$ and $b = b_1 + b_2$ and for $e_1$: $e_1 = \frac{1}{2} \frac{BH^2 + bh^2}{BH + bh}$ and for $e_2$: $e_2 = H - e_1$.

Here the section 3 is located directly adjacent in the axial direction to an encircling ring 4 disposed in the circumferential direction. A second ring 5 is disposed parallel to the ring 4. The bridge 2 and further bridges not identified by reference numbers connect the two rings 4 and 5.

Here the bridges 2 are disposed essentially parallel to the axial direction M. Two directly adjacent bridges, for example, the bridge 2 and the bridge 2a, delimit a pocket 6 here in the circumferential direction. A rolling element can, for example, be received or guided in the pocket 6. No further bridge is disposed in the circumferential direction between two directly adjacent bridges 2 and 2a. All bridges are essentially identically shaped. Therefore in the following the bridge 2 is representatively described in more detail.

In order to prevent the rolling element, for example, a rolling element having an edge, such as a cylindrical roller, a needle roller, or a tapered roller, which is guided in the pocket 6, from rubbing on the bridge 2, the bridge 2 has a tapering 7. At the location of the tapering 7 the bridge 2 has an extension u in the circumferential direction that is smaller than an extension U in a region outside the tapering 7. Here the extension u is smaller than the extension U by at least 2%, 3%, 4%, 5%, 10%, 12%, 15%, 20%. The tapering 7 results from the fact that a radius 9 is removed from the bridge, as can be seen, for example, in FIGS. 2 and 3, in the circumferential direction. Analogously a recess 11 is also disposed on a bridge edge 10 lying opposite the bridge edge 8. The purpose of the recesses 9 and 11 is to prevent the edges of rolling elements that are disposed in the pocket 6 from rubbing on the bridges. Therefore the recesses 9 and 11 are disposed directly adjacent in the axial direction to the ring 4.

In the exemplary embodiment of the Figures the recesses have the shape of radii or are configured partial-circle-shaped. In other not-depicted exemplary embodiments the recesses can have any other shape, for example, rectangular, triangular, or the like, which causes a rubbing of the rolling element to be prevented and/or the bridge to taper in the circumferential direction.

Due to the tapering 7 or the recesses 11 and 9 the bridge 2 is weakened at least in the region of the tapering 7. Under unfavorable circumstances this can lead to a breakage of the bridge 2 in the region of the tapering 7.

In order to obtain a bending stiffness in the region of the tapering 7 that at least corresponds to a bending stiffness of the bridge 2 outside the tapering 7 or is even higher, the bridge 2 includes the section 3. The section 3 overlaps with the tapering 7 in the axial direction. In other words, the section 3 is disposed such that it completely overlaps the tapering 7. In the section 3 the bending stiffness is increased by the profile shape. The section 3 extends even farther in the axial direction along the bridge 2 than the tapering 7. The section 3 has an axial extension that is at least 50%, 60%, 70%, 90%, 100%, 110% greater than an axial extension of the tapering 7. In some further, not-depicted exemplary embodiments the axial extensions can also correspond to each other.

In the exemplary embodiment of the Figures the section 3 has a U-profile. Here an open side of the U-profile points radially inward. The U-profile can also be referred to as a reinforcing profile. Parts of the reinforcing profile are disposed here on the bridge edges 8 and 10. In some further, not-depicted exemplary embodiments the profile can also have a different orientation.

The edge length of the cross-section and thus the bending stiffness can also possibly be increased by other profile shapes, for example, I-profile, L-profile, T-profile, Z-profile, H-profile, hollow profile, or the like.

In the exemplary embodiment of the figures the section 3 having the increased bending stiffness is disposed only in the region of the ring 4, i.e., only at the end of the bridge 2. In other, not-depicted exemplary embodiments the reinforced section can also be provided at both ends of the bridge. In exemplary embodiments wherein the tapering is provided at other points of the bridge, a section corresponding to the section 3 can be disposed overlapping in the axial direction with respect to the tapering. In some exemplary embodiments the bridges can also be completely profiled.

Some exemplary embodiments relate to cages that are reinforced with the help of a defined material ejection. In some exemplary embodiments cage regions that include recesses can thereby be reinforced, without, however, dispensing with the recess in the edge region of the rolling element. The bridges can have a shape that provides at least one angled material surface in a region of the recess and/or in a transition between a ring and an adjacent cage bridge. In some exemplary embodiments the angled surfaces can also be disposed on the entire bridge length or the entire bridge region.

In some exemplary embodiments specifically introduced deformations in the annular side regions of the cage can advantageously effect a stability. Compared to conventional surfaces or rectangular bridge shapes, in some exemplary embodiments the U-shaped bridge cross-section has an increased stiffness and under certain circumstances can offer a balancing or even an increasing of the stiffness of the bridge in the region of the recesses.

According to exemplary embodiments, rolling-element bearing cages can be used in all possible bearings, in particular in planetary transmissions, transmissions, in the automobile sector and also in a variety of industrial applications. In some exemplary embodiments cages that are used for ball guiding can experience an advantageous reinforcing in weakened regions via a described shaping.

In some exemplary embodiments a largely cost-neutral and effort-neutral reinforced shaping for the bridge region of the recess can possibly be achieved. Under certain circumstances the shaping can be integrated in the manufacturing steps and no additional manufacturing steps need be performed in order to achieve a reinforcing of the cage.

The exemplary embodiments and their individual features disclosed in the above description, the following claims, and the accompanying Figures can be meaningful and implemented both individually and in any combination for the realization of an exemplary embodiment in its various designs.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing cages or cage segments.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Rolling-element bearing cage
2 Bridge
3 Section
4 Ring
5 Ring
6 Pocket
7 Tapering
8 Bridge edge in the circumferential direction
9 Recess
10 Bridge edge in the circumferential direction
11 Recess
M Axial direction
u Extension of tapering in the circumferential direction
U Extension of bridge in the circumferential direction

What is claimed is:

1. A rolling-element bearing cage or cage segment configured to guide at least one rolling element comprising:
   a first circumferential ring connected to a second circumferential ring by a plurality of axially extending bridges;
   wherein a first bridge of the plurality of bridges includes a first axial portion, a second axial portion, a third axial portion, a fourth axial portion, and a fifth axial portion, wherein the first axial portion connects to the first circumferential ring and the fifth axial portion connects to the second circumferential ring, the third axial portion being connected to the first axial portion by the second axial portion, the third axial portion being connected to the fifth axial portion by the fourth axial portion, the first axial portion having a radially outermost surface that is flush with a radial outer surface of the first circumferential ring, the fifth axial portion having a radially outermost surface that is flush with an outer surface of the second circumferential ring, the third axial portion having a radially outermost surface located axially inside of the radially outermost surface of the first axial portion and the radially outermost surface of the fifth axial portion, wherein the first axial portion has a cross-section perpendicular to the axial direction having a cross sectional area and having a peripheral length greater than a peripheral length of a smallest rectangle bounding the cross section.

2. The rolling-element bearing cage or cage segment according to claim 1, wherein a bending stiffness in the first axial portion is at least 5% greater than a bending stiffness of the third axial portion which has a same cross sectional area as the cross sectional area of the first axial portion.

3. A rolling-element bearing cage or cage segment according to claim 2, wherein the first axial portion includes first and second parallel, axially extending, radially inwardly projecting flanges.

4. The rolling-element bearing cage or cage segment according to claim 1, wherein the first axial portion extends from the first circumferential ring.

5. The rolling-element bearing cage or cage segment according to claim 1, wherein the first bridge includes a first tapered section adjacent the first circumferential ring and wherein the first axial portion includes the first tapered section.

6. The rolling-element bearing cage or cage segment according to claim 5, wherein the first tapered section has a radius as an outer edge.

7. The rolling-element bearing cage or cage segment according to claim 5, wherein the first bridge includes a second tapered section adjacent the second circumferential ring and wherein the first bridge includes a U-profile, an I-profile, a T-profile, an L-profile, a Z-profile, an H-profile, or a hollow profile at least overlapping with the second tapered section.

8. The rolling-element bearing cage or cage segment according to claim 1, wherein the first axial portion is configured as a U-profile, I-profile, L-profile, T-profile, Z-profile, H-profile, or hollow profile.

9. The rolling-element bearing cage or cage segment according to claim 1, wherein the first axial portion has a length that is at least 5% of an axial length of the first bridge.

10. The rolling-element bearing cage or cage segment according to claim 1, wherein the first axial portion has a length that is at most 25% of an axial length of the first bridge.

11. The rolling-element bearing cage or cage segment according to claim 1, wherein the first bridge is made of metal.

12. The rolling-element bearing cage or cage segment according to claim 1, wherein a bending stiffness in the axial portion is at least 5% greater than a bending stiffness of the third axial portion which as a same cross sectional area as the cross sectional area of the first axial portion, wherein the first axial portion extends from the first circumferential ring and including a second axial portion extending from the second circumferential ring, wherein the first bridge includes a first tapered section adjacent the first circumferential ring and a second tapered section adjacent the second circumferential ring, wherein the first axial portion includes the first tapered section and the second axial portion includes the second tapered section, wherein the first tapered section and the second tapered section each has a radiused edge, wherein the first axial portion is configured as a U-profile, I-profile, L-profile, T-profile, Z-profile, H-profile, or hollow profile, and wherein the axial portion has a length that is at least 5% of an axial length of the first bridge and at most 25% of an axial length of the first bridge.

13. The rolling-element bearing cage or cage segment according to claim 1, wherein the first axial portion includes at least one radially inwardly projecting flange.

14. The rolling-element bearing cage or cage segment according to claim 1, wherein the first axial portion includes first and second parallel, axially extending, radially inwardly projecting flanges.

15. The rolling-element bearing cage or cage segment according to claim 14, wherein the first and second flanges extend along a tapered portion of the bridge adjacent to the first circumferential ring.

16. The rolling-element bearing cage or cage segment according to claim 1, wherein the first axial portion includes first and second parallel, axially extending, radially inwardly projecting flanges.

17. The rolling-element bearing cage or cage segment according to claim 16, wherein the first and second flanges extend along a tapered portion of the bridge adjacent to the first circumferential ring.

* * * * *